(12) United States Patent
Weixler (10) Patent No.: US 11,292,068 B2
(45) Date of Patent: Apr. 5, 2022

(54) GEAR MANUFACTURING MACHINE (71) Applicant: Liebherr-Verzahntechnik GmbH, Kempten/Allgaeu (DE)

(72) Inventor: Johannes Weixler, Durach (DE)

(73) Assignee: LIEBHERR-VERZAHNTECHNIK GMBH, Kempten/Allgaeu (DE)

( * ) Notice: Subject to any disclaimer, the term of this patent is extended or adjusted under 35 U.S.C. 154(b) by 97 days.

(21) Appl. No.: 16/595,284

(22) Filed: Oct. 7, 2019

(65) Prior Publication Data
US 2020/0114441 A1 Apr. 16, 2020

(30) Foreign Application Priority Data
Oct. 11, 2018 (DE) ...................... 10 2018 125 213.7

(51) Int. Cl.
*B23F 5/20* (2006.01)
*B23F 23/12* (2006.01)
(Continued)

(52) U.S. Cl.
CPC .............. *B23F 5/205* (2013.01); *B23F 5/163* (2013.01); *B23F 15/06* (2013.01); *B23F 17/006* (2013.01);
(Continued)

(58) Field of Classification Search
CPC .......... B23F 5/163; B23F 5/205; B23F 15/06; B23F 17/006; B23F 19/102; B23F 19/104;
(Continued)

(56) References Cited

U.S. PATENT DOCUMENTS 1,453,470 A * 5/1923 Lees .................... B23Q 1/70
409/236
2,117,930 A * 5/1938 Zimmermann .......... B23Q 3/06
269/52
(Continued)

FOREIGN PATENT DOCUMENTS

DE 6800602 U 4/1969
DE 231751 A1 1/1986
(Continued)

OTHER PUBLICATIONS

JP-2003311502-A machine translation, pp. 2-3 (Year: 2021).*
DE-4210302-A1 machine translation, p. 1 (Year: 2021).*
SU-1187936-A machine translation, pp. 1-2 (Year: 2021).*

*Primary Examiner* — Nicole N Ramos
(74) *Attorney, Agent, or Firm* — McCoy Russell LLP (57) ABSTRACT

The present disclosure comprises a gear manufacturing machine comprising a workpiece holder and a tool holder, which can each be caused to rotate by means of a drive, wherein the tool holder is arranged on a machining head, which can be moved relative to the workpiece holder by one or a plurality of motion axes of the gear manufacturing machine for gear manufacturing machining a workpiece held in the workpiece holder by means of a tool held in the tool holder, the tool holder having a counterholder. According to the present disclosure the counterholder is movable by a motion axis from its working position to an inactive position and/or is arranged on the machining head of the gear manufacturing machine in a releasably connectable manner.

21 Claims, 11 Drawing Sheets (51) Int. Cl.
*B23F 17/00* (2006.01)
*B23F 15/06* (2006.01)
*B23F 5/16* (2006.01)

(52) U.S. Cl.
CPC ...... *B23F 23/1237* (2013.01); *B23F 23/1243* (2013.01)

(58) Field of Classification Search
CPC ........ B23F 21/005; B23F 21/16; B23F 23/06; B23F 23/1243; B23Q 2230/006; B23Q 39/048
See application file for complete search history.

(56) References Cited

U.S. PATENT DOCUMENTS

| | | | | |
|---|---|---|---|---|
| 2,963,944 | A * | 12/1960 | Charles | B23C 1/12 409/144 |
| 4,015,510 | A * | 4/1977 | Hodgson | B23F 23/1206 409/236 |
| 4,034,647 | A * | 7/1977 | Hoglund | B23C 5/26 409/221 |
| 4,590,661 | A * | 5/1986 | Lunazzi | B23F 23/1243 409/11 |
| 4,684,300 | A * | 8/1987 | Break | B23Q 3/10 409/134 |
| 5,002,443 | A * | 3/1991 | Yang | B23Q 1/54 409/201 |
| 5,192,172 | A * | 3/1993 | Lunazzi | B23B 31/4073 409/11 |
| 5,213,559 | A * | 5/1993 | Lunazzi | B23F 23/04 409/7 |
| 5,634,250 | A | 6/1997 | Mihailovic | |
| 5,904,457 | A * | 5/1999 | Suwijn | B23F 23/04 409/1 |
| 8,931,984 | B2 * | 1/2015 | Zeller | B23F 23/1237 409/11 |
| 8,967,925 | B2 * | 3/2015 | Tsuchimochi | B23F 5/22 409/15 |
| 2005/0198793 | A1 * | 9/2005 | Ueda | B23F 5/22 29/27 C |
| 2007/0157774 | A1 * | 7/2007 | Gross | B23F 23/1206 82/117 |
| 2012/0121353 | A1 | 5/2012 | Tsuchimochi | |
| 2013/0225379 | A1 * | 8/2013 | Kato | B23F 19/10 483/1 |
| 2014/0271010 | A1 * | 9/2014 | Napau | B23F 9/105 409/12 |
| 2017/0182572 | A1 * | 6/2017 | Takahashi | B23C 3/30 |
| 2017/0232564 | A1 * | 8/2017 | Ishizu | B23Q 3/15533 483/31 |

FOREIGN PATENT DOCUMENTS

| | | | |
|---|---|---|---|
| DE | 8810536 U1 | 12/1988 | |
| DE | 4210302 A1 * | 9/1993 | ............ E05F 15/697 |
| DE | 102006001026 A1 | 7/2007 | |
| DE | 102012020210 A1 | 4/2014 | |
| DE | 102017003648 A1 | 10/2018 | |
| EP | 0516596 A1 | 12/1992 | |
| GB | 137698 A * | 1/1920 | ............ B23C 7/00 |
| GB | 255399 A * | 7/1926 | ............ B23C 5/04 |
| JP | 2003311502 A * | 11/2003 | |
| SU | 1187936 A * | 10/1985 | |
| WO | 2009121387 A1 | 10/2009 | |

* cited by examiner

GEAR MANUFACTURING MACHINE

CROSS REFERENCE TO RELATED APPLICATION

The present application claims priority to German Application No. DE 10 2018 125 213.7 entitled "GEAR MANUFACTURING MACHINE", filed on Oct. 11, 2018. The entire contents of the above listed application are hereby incorporated by reference for all purposes.

TECHNICAL FIELD

The present disclosure relates to a gear manufacturing machine, comprising a workpiece holder and a tool holder, which can each be caused to rotate by means of a drive, wherein the tool holder is arranged on a machining head, which can be moved relative to the workpiece holder by one or a plurality of motion axes of the gear manufacturing machine for gear manufacturing machining a workpiece held in the workpiece holder by means of a tool held in the tool holder, the tool holder having a counterholder.

BACKGROUND AND SUMMARY

Especially during milling processes, the use of a counterholder is necessary in most cases to ensure the required stability, due to the high forces acting on the tool.

The not prepublished reference DE 10 2017 003 648 of the same applicant discloses that a milling tool and a skiving tool are clamped in the same tool holder. The skiving tool can here be used for fine machining of the toothing manufactured by the milling tool or for manufacturing on the same workpiece a further toothing that cannot be manufactured by the milling tool. In order to avoid interfering contours, a particularly slender counterholder is used.

It is the object of the present disclosure to provide an improved gear manufacturing machine.

This object is achieved by a gear manufacturing machine comprising a workpiece holder and a tool holder according to the disclosure.

Further developments of the present disclosure are the subject matters of the subclaims.

The present disclosure comprises a gear manufacturing machine comprising a workpiece holder and a tool holder, which can each be caused to rotate by means of a drive, wherein the tool holder is arranged on a machining head, which can be moved relative to the workpiece holder by one or a plurality of motion axes of the gear manufacturing machine for gear manufacturing machining a workpiece held in the workpiece holder by means of a tool held in the tool holder, the tool holder having a counterholder. According to the present disclosure, the counterholder is movable by a motion axis from its working position to an inactive position and/or is arranged on the machining head of the gear manufacturing machine in a releasably connectable manner.

According to a first variant of the present disclosure, the counterholder is arranged on the machining head such that it is movable by a motion axis from its working position to an inactive position. This allows the counterholder to be moved to its inactive position for machining steps and/or machining modes in which it is not required, so as to enlarge the working area available and/or reduce the interfering contour formed by the counterholder.

According to a possible embodiment, the machining head comprises a drive by means of which the counterholder can be moved from its working position to the inactive position. Alternatively, the counterholder may, however, also be manually movable.

According to a second variant of the present disclosure, the counterholder is arranged on the machining head of the gear manufacturing machine in a releasably connectable manner. The counterholder can thus be dismounted for machining steps and/or machining modes in which it is not required, so as to enlarge the working area available and/or reduce the interfering contour formed by the counterholder.

According to a possible embodiment of the present disclosure, the counterholder is arranged in a movable and/or releasably connectable manner on a slide of a linear axis by which it is displaceable relative to the tool holder in the axial direction of the latter. Such a linear axis is normally provided in order to allow clamping and unclamping of the tool and/or in order to adapt the position of the counterholder to tools of different lengths.

Therefore, the movement of the counterholder to its inactive position may not take place by this linear axis but by an additional axis by which the counterholder is arranged on the slide.

According to a possible embodiment of the present disclosure, the counterholder is pivotably arranged on the machining head of the gear manufacturing machine. In particular, it is pivotably arranged on the slide of the above-mentioned linear axis.

The counterholder may be adapted to be folded in or folded away by pivoting from its working position to the inactive position.

According to a first possible embodiment of the present disclosure, the counterholder is pivotable by a pivot axis extending in a plane perpendicular to the axial direction of the tool holder. As a result, a particularly compact and stable arrangement is obtained.

The counterholder may be adapted to be folded in in the direction of the tool holder. As a result, the counterholder, when occupying the working position, can rest on a stop, which prevents a pivotal movement away from the tool holder.

According to a second possible embodiment of the present disclosure, the counterholder is pivotable by a pivot axis extending parallel to the axial direction of the tool holder. The counterholder can thus be folded away to the side, when it is not required.

According to a possible embodiment of the present disclosure, all the elements of the counterholder and its support exhibit a predetermined clear distance to the axis of the tool holder at the inactive position of the counterholder. In axial extension of the tool holder, the counterholder will thus no longer form an interfering contour when occupying its inactive position.

At the inactive position of the counterholder, all the interfering contours on the machining head may exhibit, starting from the tool holder and seen in an axial direction, a predetermined clear distance to the axis of the tool holder. It follows that, in axial extension of the tool holder, interfering contours on the machining head will no longer exist at all.

Optionally, the clear distance corresponds at least to the maximum admissible radius with which a tool can still be clamped in the tool holder.

According to a possible embodiment of the present disclosure, the counterholder, when occupying its inactive position, is accommodated in an accommodation opening of the machining head. The counterholder will thus be protected against damage and/or dirt at the inactive position.

In particular, the counterholder may be adapted to be folded into an accommodation opening of the machining head.

Optionally, the counterholder closes the accommodation opening, when occupying its inactive position. For this purpose, the counterholder may comprise a closing plate.

According to a possible embodiment, the counterholder is supported in the accommodation opening.

Optionally, the counterholder is arranged on the machining head and/or connectable thereto in such a way that it does not need to be readjusted, when it moves from the inactive position to the working position or when it is mounted to the machining head.

According to a possible embodiment of the present disclosure, the counterholder, when occupying its working position, rests on a stop element. In particular, the counterholder may be pivoted to a position of contact with such a stop element. Hence, the latter defines the working position.

According to a possible embodiment of the present disclosure, the stop element comprises tapered pins and/or tapered pin reception units. In particular, these elements interact with complementary tapered pin reception units and/or tapered pins on the counterholder. This increases the positioning accuracy of the counterholder.

According to a possible embodiment of the present disclosure, the counterholder is adapted to be hydraulically clamped at its working position. This increases the positioning accuracy of the counterholder.

According to a possible embodiment of the present disclosure, the counterholder is releasably connectable to the machining head by a quick-clamping system.

In particular, the quick-clamping system is a zero-point clamping system. In this way, the position of the counterholder can be reproduced precisely without any adjustment operations.

According to a possible embodiment of the present disclosure, the quick-clamping system comprises tapered pins and/or tapered pin reception units. This increases the positioning accuracy of the counterholder.

According to a possible embodiment of the present disclosure, the gear manufacturing machine comprises an automatic tool changer. The latter allows a fast change of the respective tool used.

According to a possible embodiment of the present disclosure, the gear manufacturing machine comprises a milling tool and a skiving tool. These tools can be used in different machining steps and/or machining modes.

According to a possible embodiment of the present disclosure, the gear manufacturing machine comprises a control unit having a function for carrying out a method of the type described hereinafter. Optionally, the control unit executes the method automatically.

The present disclosure comprises a method of manufacturing at least one toothed workpiece, wherein, in a first machining step and/or machining mode, a workpiece is machined by means of a first tool clamped between a tool holder and a counterholder, and wherein, in a second machining step and/or machining mode, a workpiece is machined by means of a second tool clamped in the tool holder on one side thereof, the counterholder occupying an inactive position or being dismounted from the machining head during the second machining step.

In particular, the method may take place making use of a gear manufacturing machine of the type described in more detail hereinbefore.

According to a possible embodiment of the present disclosure, the workpiece is machined by milling in one of the machining steps and/or machining modes. In the other machining step and/or machining mode, the workpiece is machined by skiving. In the case of these two machining processes, it may frequently happen that one of these processes necessitates the use of a counterholder, which interferes with the other process.

In particular, the workpiece may, in a first variant, be machined by milling in the first machining step and/or machining mode. According to a second variant, the workpiece may, alternatively, be machined by skiving in the first machining step and/or machining mode.

According to a possible embodiment of the present disclosure, the first machining step and/or machining mode takes place with a first axis intersection angle between the tool and the workpiece, and the second machining step and/or machining mode takes place with a second axis intersection angle between the tool and the workpiece, the difference between the first and the second axis intersection angle being greater than 45°. As a result, the counterholder often forms an interfering contour in at least one of the machining steps or machining modes.

In particular, the difference between the first and the second axis intersection angle may be greater than 70°.

Optionally, the difference between the first and the second axis intersection angle may be less than 135°, optionally less than 110°, further optionally less than 100°.

According to a possible embodiment of the present disclosure, the first and the second machining step and/or machining mode are used for machining the same workpiece. In particular, the same workpiece may be machined in two successive machining steps by means of different tools.

According to a possible embodiment of the present disclosure, the first and the second machining step and/or machining mode are, however, used for machining different workpieces. The gear manufacturing machine according to the present disclosure will here increase the flexibility in manufacturing different workpieces by means of different tools.

According to a possible embodiment of the present disclosure, the first and the second machining step are used for machining two different toothings of a workpiece. The machining carried out is here optionally milling for machining a first toothing and skiving for machining a second toothing.

According to a possible embodiment of the present disclosure, the diameter of the first toothing is larger than that of the second toothing and/or forms an interfering contour for the second toothing.

According to a possible embodiment of the present disclosure, the toothings are spur gear toothings.

According to a possible embodiment of the present disclosure, the first and the second machining step are used in succession for machining the same toothing of a workpiece.

In particular, the machining carried out first is roughing and the machining carried out subsequently is finishing. Optionally, milling is here carried out for the roughing process and skiving is carried out for the finishing process.

According to a possible embodiment of the present disclosure, the toothing is a worm toothing, in particular a worm toothing of a drive element of a steering drive of a vehicle.

In the machining steps and/or machining modes carried out by the present disclosure, soft machining or hard-fine machining of the workpiece may be carried out.

The machining steps and/or machining modes may be used for machining a blank or a hardened workpiece.

In particular, a toothing may be manufactured on a blank within the framework of the first and/or second machining step and/or machining mode. It follows that, according to the present disclosure, the phrase "machining a toothing" also comprises the manufacturing of a toothing on a previously untoothed workpiece.

BRIEF DESCRIPTION OF THE FIGURES

The present disclosure will now be described in more detail on the basis of embodiments and drawings, in which FIG. 3 shows the embodiment shown in FIGS. 1 and 2, with the counterholder being moved to its inactive position and in particular folded in, FIG. 4 shows the embodiment shown in FIG. 1 to FIG. 3, with the counterholder occupying its inactive position and being in particular folded in.

DETAILED DESCRIPTION

Figure 1:
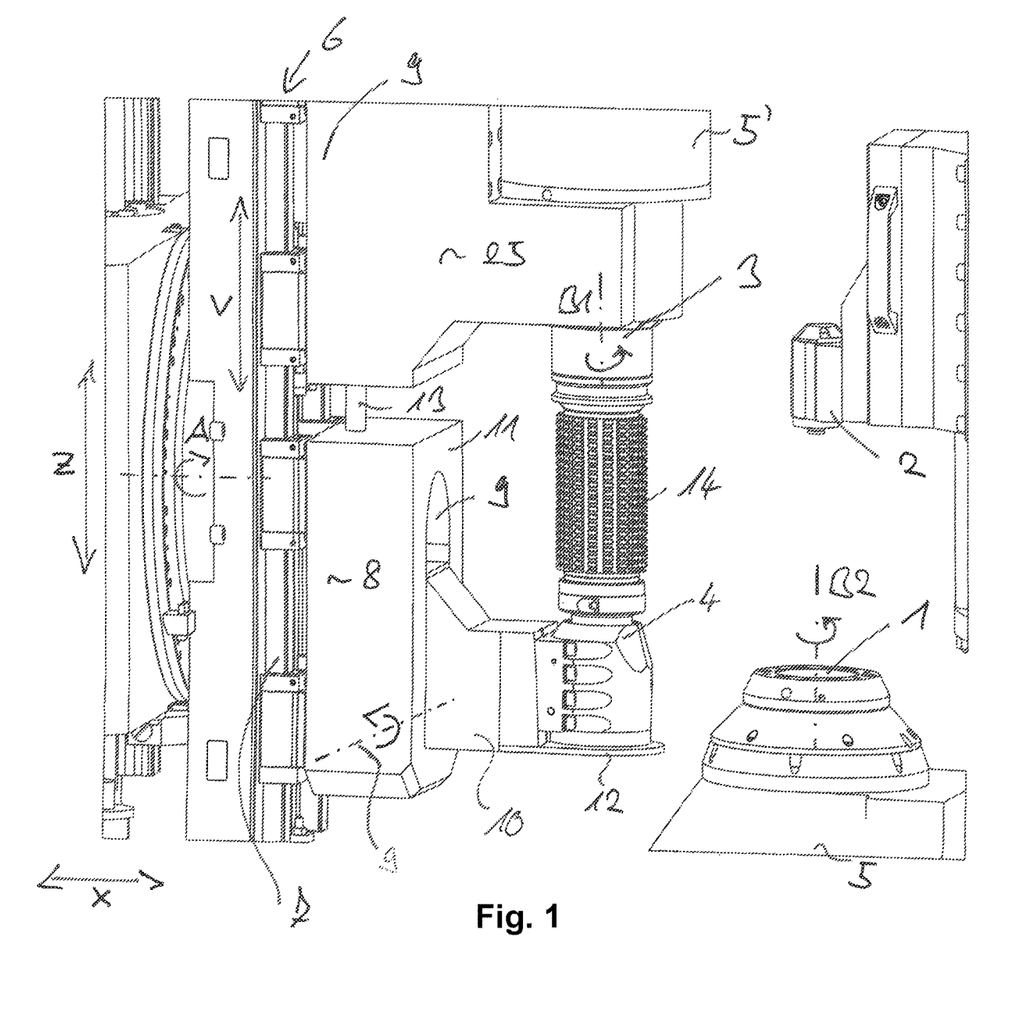
FIG. 1 shows a first embodiment of a gear manufacturing machine according to the present disclosure in a first machining step and/or machining mode, in which the counterholder is at its working position and a tool is clamped between the tool holder and the counterholder.

FIG. 1 shows an embodiment of a gear manufacturing machine according to the present disclosure, comprising a workpiece holder 1 and a tool holder 3, which can each be caused to rotate about the respective rotary axes B2 and B1 by a drive 5 and 5', respectively, shown only schematically. The tool holder 3 is arranged on a machining head 6 of the gear manufacturing machine, the machining head being movable by a plurality of motion axes relative to the workpiece holder 1 for gear manufacturing machining a workpiece held in the workpiece holder by a tool 14 held in the tool holder 3.

Figure 4:
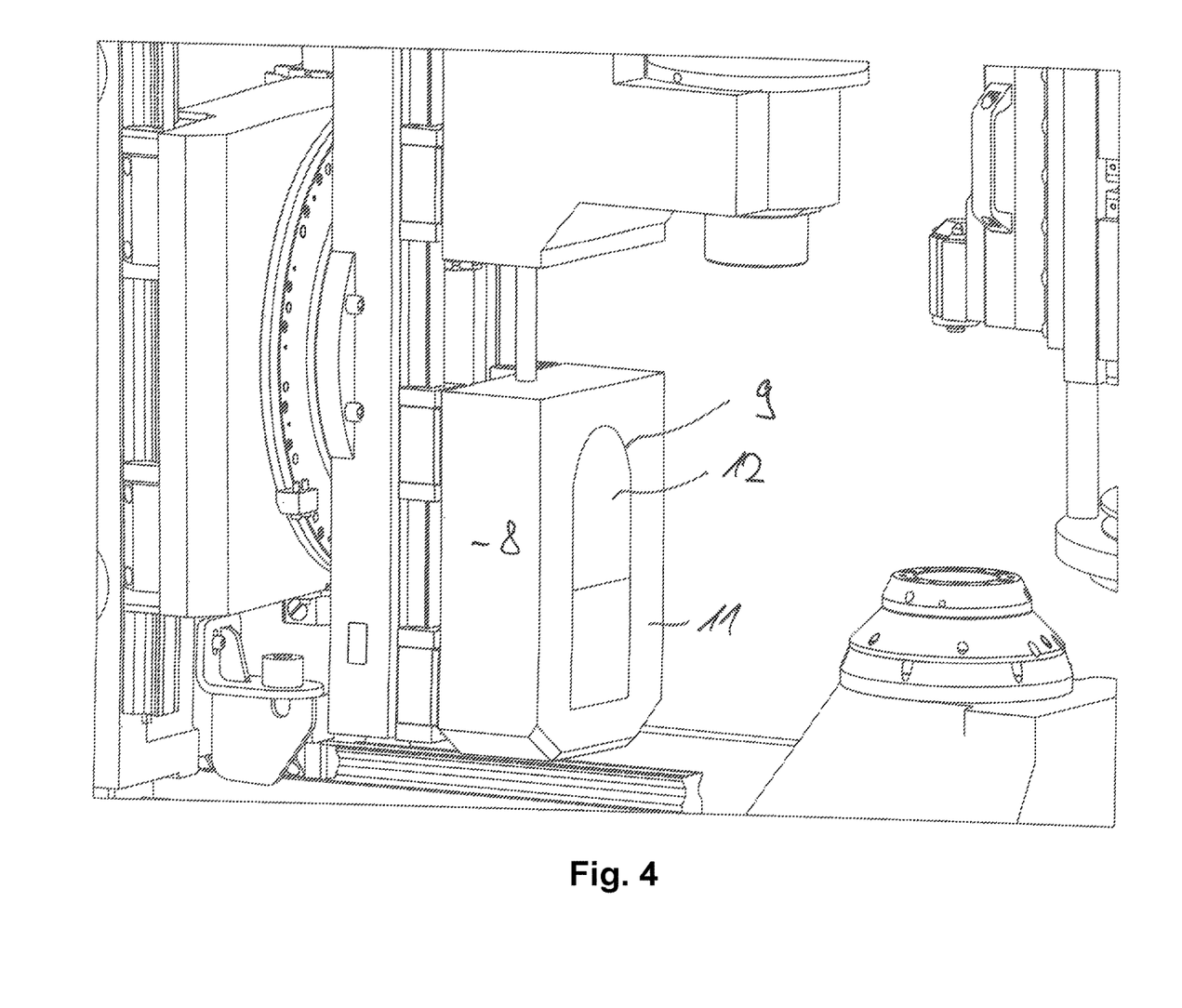

The tool holder 3 comprises a counterholder 4, which, according to the present disclosure, is arranged by a motion axis on the machining head such that it is movable from a working position, which is shown in FIG. 1 and in which the counterholder is in alignment with the tool holder 3, to an inactive position, which is shown in FIG. 4 and in which the counterholder is no longer in alignment with the tool holder 3, but is located laterally beside the rotary axis B1.

In the present embodiment, the counterholder is, for this purpose, pivotably arranged on the machining head 6 for pivoting about a pivot axis 4 and is thus configured such that it can be folded in and out.

The movement of the counterholder from the working position to the inactive position, i.e. in the embodiment shown in FIG. 1 the folding in and out of the counterholder, may be carried out either by a drive of the gear manufacturing machine or by hand.

In the present embodiment, the counterholder 4 is pivotable about a pivot axis 9 extending in a plane that is perpendicular to the rotary axis B1 of the tool holder 3. FIG. 1 shows the counterholder 4 in the extended position, the tool 14 being clamped between the tool holder 3 and the extended counterholder 4.

The counterholder 4 is here pivotably arranged on a slide 8 guided on a linear axis 7, by which the distance between the counterholder 4 and the tool holder 3 can be varied. For this purpose, the slide 8 can be moved along the linear axis 7 parallel to the rotary axis B1 of the tool holder 3. In the present embodiment, a threaded rod 13 is provided, and the distance between the tool holder 3 and the counterholder 4 can be varied through the rotary position of this threaded rod 13.

The slide 8 comprises a reception unit 9, in which the counterholder 4 is supported so as to be pivotable about the pivot axis 9 and into which the counterholder is countersunk during folding in.

Figure 2:
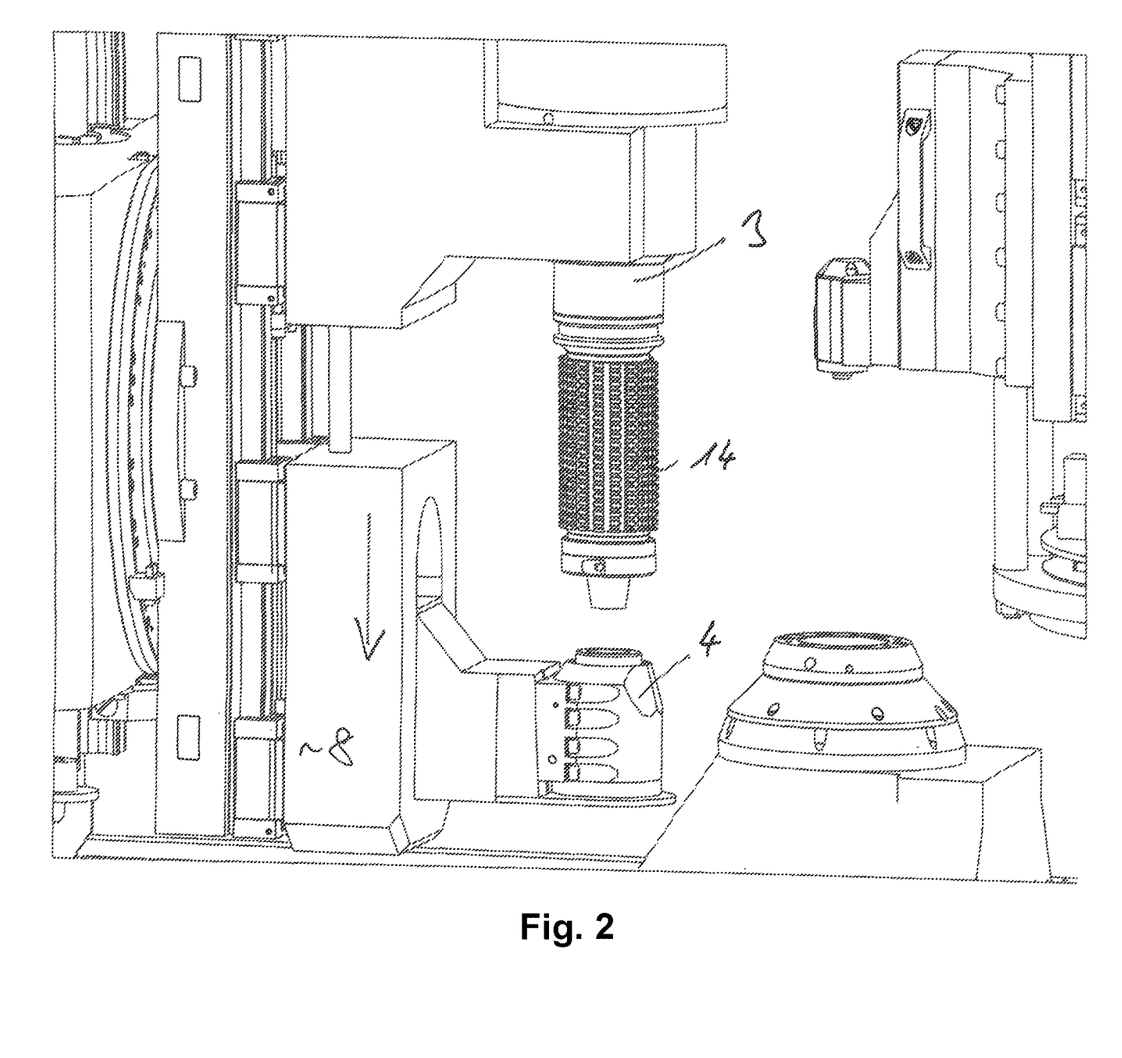
FIG. 2 shows the embodiment shown in FIG. 1, with the counterholder moved away from the tool.
Figure 3:
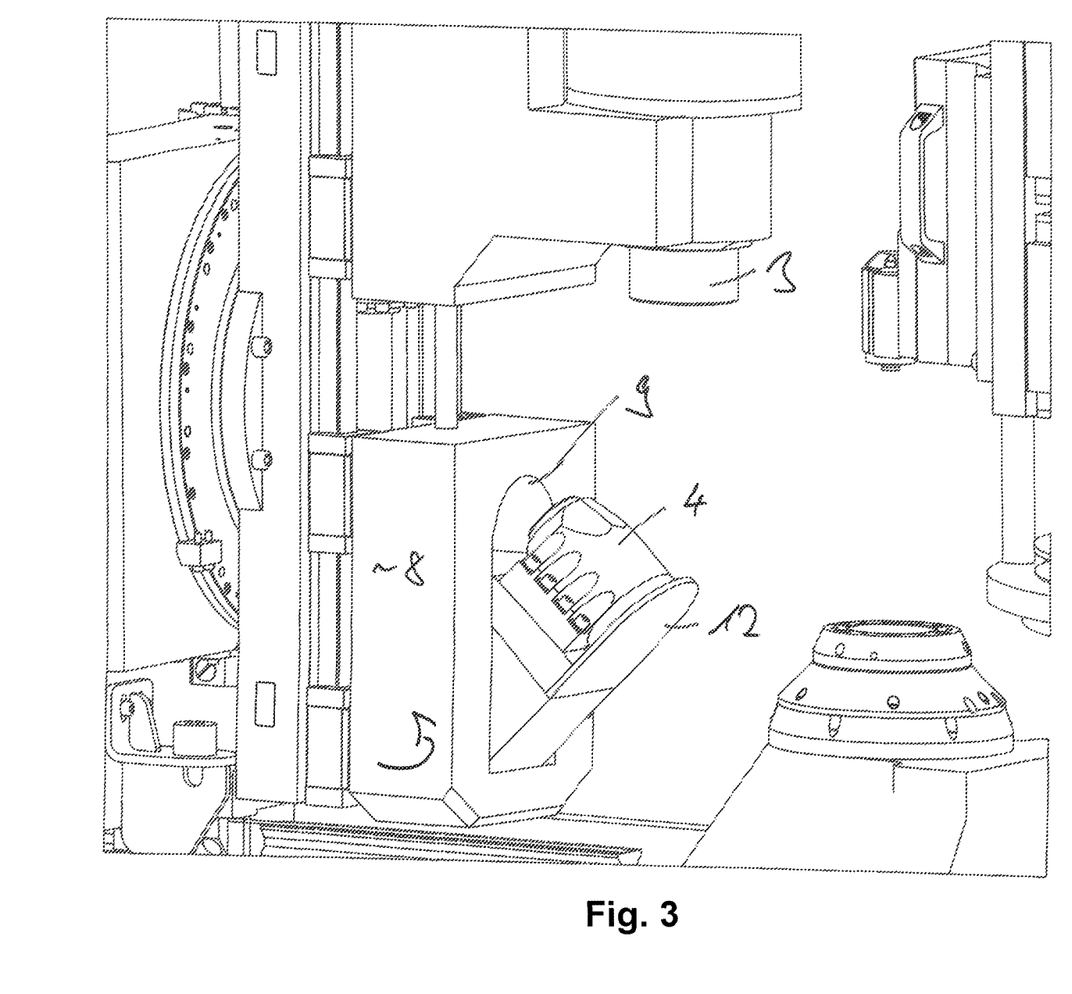

For moving the counterholder 4 from the working position shown in FIG. 1 to the inactive position, it is first moved, as shown in FIG. 2, by the linear axis 7 in an axial direction away from the tool holder 3. As shown in FIG. 3, the counterholder 4 is then—possibly after the tool 14 has been removed—folded in in the direction of the tool holder 3. The inactive position of the counterholder 4 is then shown in FIG. 4. As can be seen from FIG. 4, the counterholder is positioned fully inside the reception unit 9 of the slide 8 in the inactive position.

The counterholder 4 comprises a counterholder arm 10, by which it is supported in the reception unit 9. At the extended position, the rotary axis of the counterholder 4 is thus in alignment with the rotary axis B1 of the tool holder 3. At the folded-in position, however, the counterholder exhibits a clear distance to the rotary axis B1 of the counterholder and therefore does not form an interfering contour for a tool clamped on one side thereof. The clear distance of the folded-in counterholder may be larger than the maximum radius of a tool that can be held in the tool holder 3, or optionally larger than 1.2 times the value of the maximum radius of a tool that can be held in the tool holder.

The counterholder 4 additionally comprises a closing plate 12 by means of which the opening 9 in the slide 8 is closed at the folded-in position. The counterholder is thus protected against dirt at the folded-in position.

Figure 5:
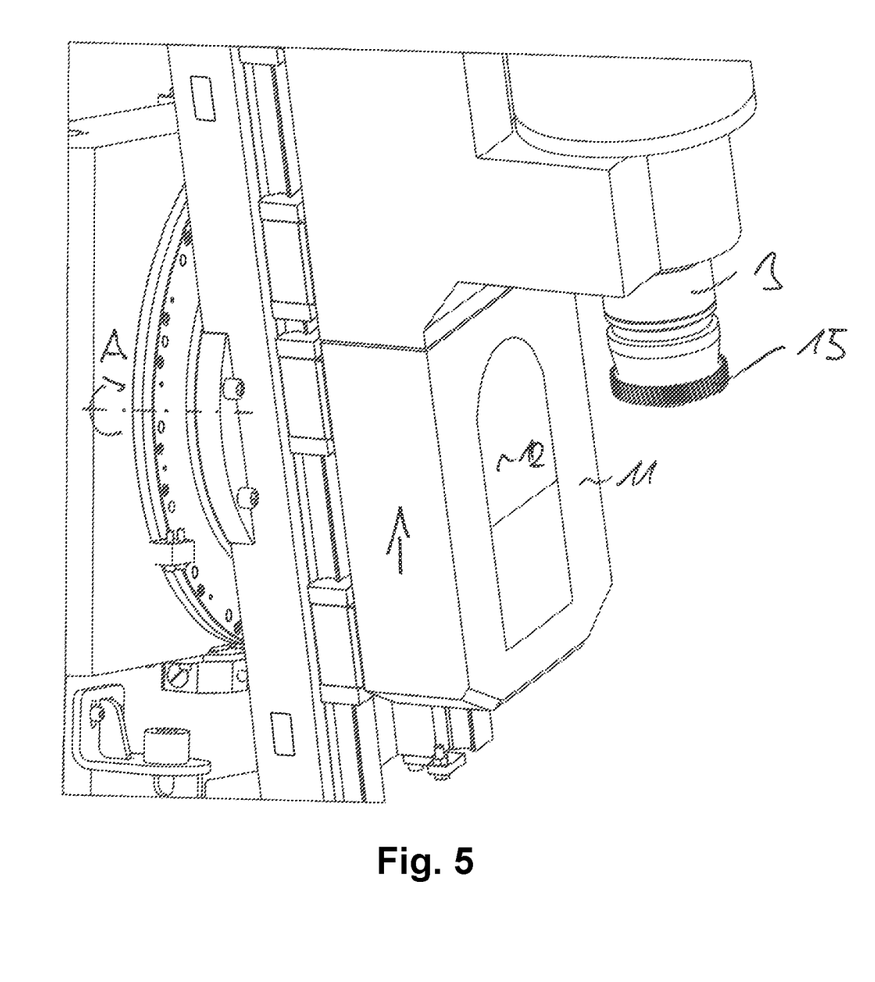
FIG. 5 shows the embodiment shown in FIG. 1 to FIG. 4, with the counterholder occupying its inactive position and a tool being clamped at the tool holder on one side thereof.

As shown in FIG. 5, a tool 15 can be clamped on one side thereof in the tool holder 3 at the inactive position of the counterholder, without the counterholder forming an interfering contour as regards the machining of a workpiece with the tool clamped on one side thereof. In particular, this means that there will be no interfering contours whatsoever on the machining head in the axial direction in extension of the tool. As shown in FIG. 5, the counterholder and the slide 8, respectively, can additionally also be moved in the direction of the tool holder 3, in the folded-in condition of the counterholder, so that an even more compact arrangement will be obtained.

In the working position of the counterholder, the latter may rest on a stop, which, in the present embodiment, is optionally arranged on the slides 8, and in particular within the opening 9. The stop is configured such that the working position of the counterholder 4 is exactly reproducible without adjustment. To this end, the stop may e.g. comprise tapered pins and/or tapered pin reception units, which interact with a complementary counterpart on the counterholder arm 10 of the counterholder. In this way, the position of the counterholder need not be adjusted in the case of a change between the inactive position and the working position.

According to a possible further development, the counterholder is hydraulically clamped at the working position so as to reproduce the latter exactly.

According to an alternative embodiment, which is not shown, the counterholder may also be pivotable about a pivot axis extending parallel to the rotary axis B1 of the tool holder 3. If the counterholder is not needed, it can thus be folded to the side out of the working area. Also in this case, the counterholder may be pivotably arranged on a slide 8 of the type shown in the embodiment.

According to a further embodiment, which is not shown, the counterholder 4 can releasably be connected to the slide 8 by a quick-clamping system. In this way, the counterholder can be dismounted easily, if it is not needed. If it is needed again, it will be mounted by the quick-clamping system. The quick-clamping system is a zero-point clamping system, which allows an exact reproducibility of the position of the counterholder relative to the slide 8, without the necessity of adjusting the counterholder on the slide 8. Also this structural design allows the gear manufacturing machine to be operated in two different operating modes, one with a counterholder and one without a counterholder for the tool holder.

In the following, features of the embodiment of the gear manufacturing machine according to the present disclosure shown in FIG. 1 to FIG. 5 will be described. These features may be realized, individually or in combination, in the case of any gear manufacturing machine according to the present disclosure, and in combination with any further development of the counterholder according to the present disclosure.

The machining head 6, which has arranged thereon the tool holder 3 and the counterholder 4, is pivotable by a pivot axis A, by which the axis intersection angle between the rotary axis B1 of the tool holder 3 and the rotary axis B2 of the workpiece holder 1 is adjustable. The pivot axis A may extend perpendicular to the two rotary axes B1 and B2.

The machining head 6 is adapted to be moved by a linear axis Z in a direction parallel to the rotary axis B2 of the workpiece holder 1. In this way, a tool held in the tool holder 3 can be moved along the workpiece width.

The machining head is adapted to be moved by a linear axis X for adjusting the center distance between the rotary axes B1 and B2. The linear axis X may extend perpendicular to the two rotary axes B1 and B2 and/or parallel to the pivot axis A.

The machining head has a linear axis V by which the tool holder 3, together with the counterholder 4, is movable in a direction parallel to the rotary axis B1 of the tool holder 3. The linear axis V is also referred to as shift axis and is pivotable by the pivot axis A.

In the present embodiment, the linear axis V is provided by the linear axis 7, by means of which also the distance between the tool holder 3 and the counterholder 4 can be varied. For this purpose, also the tool holder 3 is mounted on a slide 9, which is movable along the linear axis 7. A drive, which is not shown, is here provided, through which the slide 9 and the slide 8 can be moved together along the axis 7. The tool holder 3 is arranged on a support arm 25 of the slide 9 in spaced relationship with the linear axis 7.

The motion axes of the gear manufacturing machine may be NC axes. In particular, the two rotary axes B1 and B2 are NC axes, so that a generating coupling of the two axes can take place by controlling the gear manufacturing machine.

Also the workpiece holder 1 is provided with a counterholder 2, which is adapted to be moved by a further linear axis in the axial direction of the rotary axis B2, so as to vary the distance between the counterholder 2 and the workpiece holder 1.

Fields of application of the gear manufacturing machine according to the present disclosure as well as embodiments of the method according to the present disclosure will be described in more detail hereinafter making reference to FIG. 6 to FIG. 11.

Figure 6:
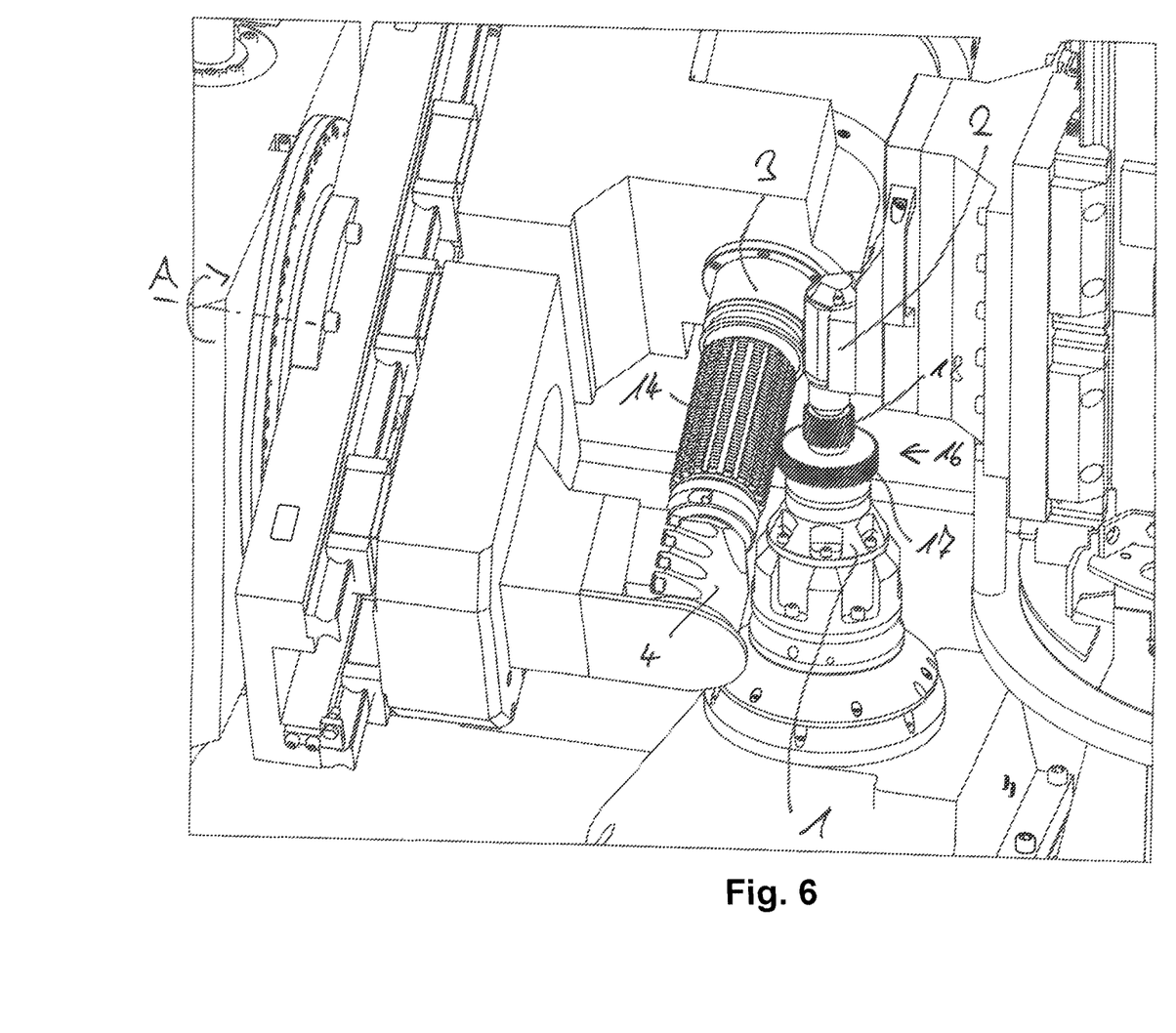
FIG. 6 shows a first step of a first embodiment of a method according to the present disclosure, in which a first toothing of a workpiece is machined through a tool clamped on both sides thereof.
Figure 7:
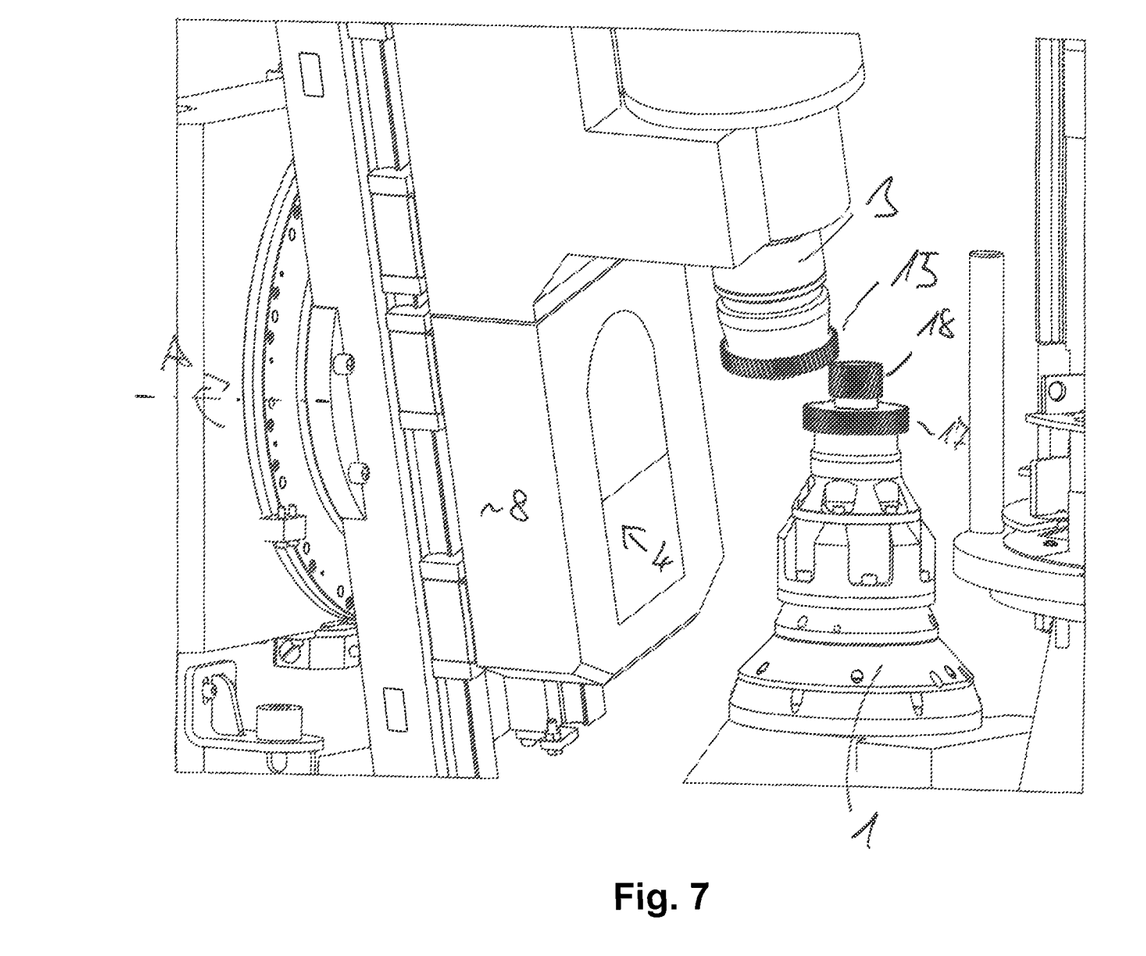
FIG. 7 shows a second step of the first embodiment of a method according to the present disclosure, in which a second toothing of the same workpiece is machined through a tool clamped on one side thereof, with the counterholder occupying the inactive position.

FIGS. 6 and 7 show a first and a second machining step of a first embodiment of a method according to the present disclosure. In the first machining step shown in FIG. 6, a tool 14 is clamped on both sides thereof between the tool holder 3 and the counterholder 4, the counterholder 4 occupying the working position for this purpose. In the second machining step shown in FIG. 7, however, a second tool 15 is clamped at the tool holder 3 on one side thereof and the counterholder 4 occupies the inactive position so as not to form an interfering contour.

In the first embodiment of a method shown in FIGS. 6 and 7, the two tools 14 and 15 are used for machining the same workpiece 16. The two tools, however, machine two different toothings 17 and 18 of the workpiece 16. Machining in the sense of the present disclosure also means manufacturing a toothing from a blank. The method is used for manufacturing spur gear toothings 17 and 18 on the workpiece 16. The toothings may be straight toothings or helical toothings.

In the present embodiment, the first machining step in FIG. 6 takes place making use of a cutter 14, through which the first toothing 17 of the workpiece 16 is manufactured. The present embodiment makes use of a hob cutter 14 and the toothing 17 is thus manufactured by hobbing. The counterholder 4 is at the working position, so that the cutter can be clamped on both sides thereof. Due to the comparatively large axis intersection angle, the counterholder does not form a relevant interfering contour.

In the second machining step shown in FIG. 7, however, a skiving tool 15 is used, and the second toothing 18 of the workpiece 16 is thus manufactured by skiving. Skiving is advantageous insofar as it can also be used for manufacturing toothings that lie next to interfering contours and are difficult to access.

In the case of the workpiece 16 shown in the present embodiment, the first toothing 17, due to its larger diameter, forms such an interfering contour for the second toothing 18. Due to the fact that a cutter 14 as well as a skiving tool 15 are used, both toothings can nevertheless be manufactured.

Due to the comparatively small axis intersection angle occurring during skiving of the spur gear toothing shown, the counterholder 4 would, however, form an interfering contour, since it would collide with the workpiece holder during machining of the workpiece. Pivoting to the inactive position allows skiving to be carried out. In view of the fact that the forces applied during skiving are smaller than those applied during hobbing, it will suffice to clamp the skiving tool on one side thereof.

By folding-in the counterholder 4 in the second machining step, the counterholder is therefore prevented from forming an interfering contour for skiving. In this way, both toothings can be manufactured on the same machine in successive machining steps.

In the first machining step shown in FIG. 6, the workpiece 16 is clamped on both sides thereof between the workpiece holder 1 and the counterholder 2 of the workpiece holder. For the second machining step shown in FIG. 7, the workpiece may either remain clamped on both sides thereof, or the counterholder 2 is moved upwards out of the working area so as to avoid interfering contours.

The sequence of machining steps is irrelevant in the first embodiment. Hence, the designations first and second machining step are only used for distinguishing between the machining steps and therefore do not identify the chronological sequence.

Figure 8:
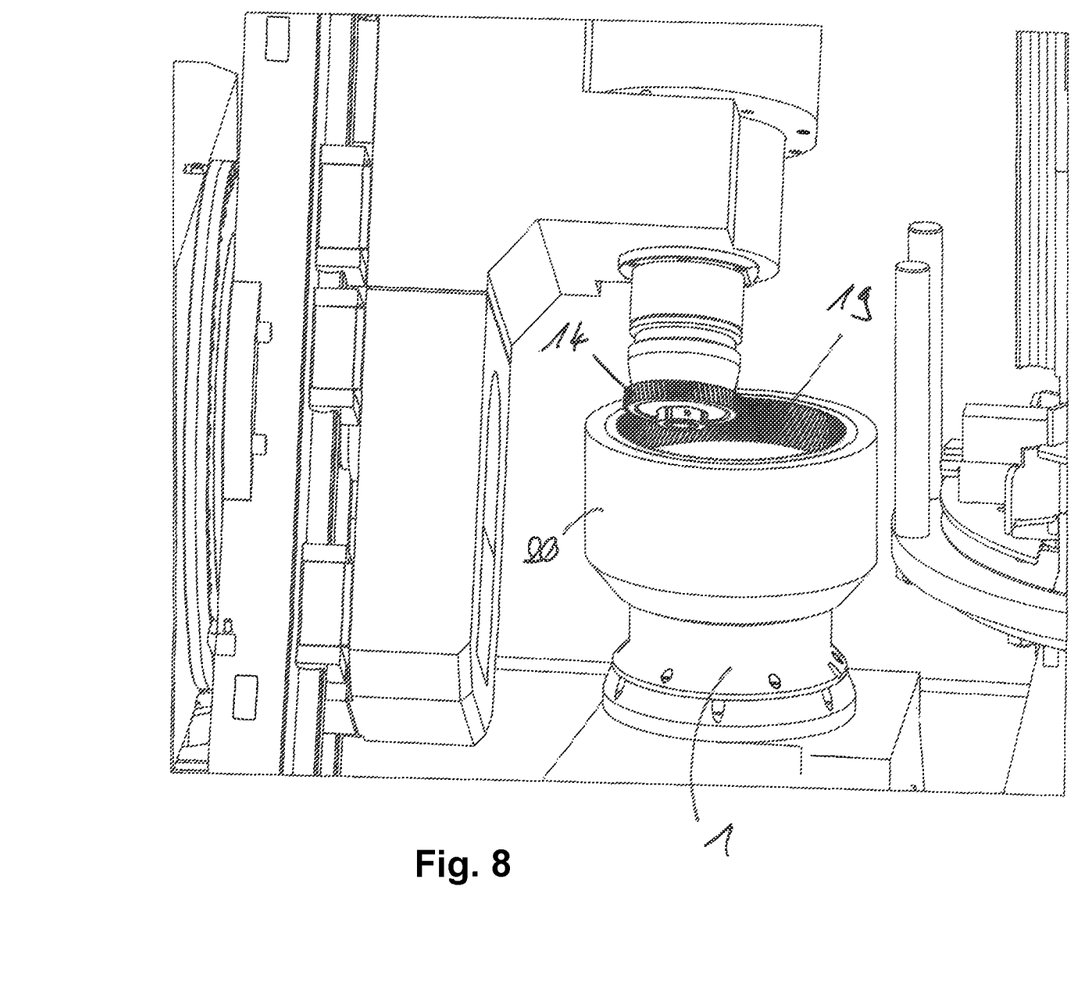
FIG. 8 shows a second embodiment of the method according to the present disclosure, in which a tool is machined in a second machining mode through a tool clamped on one side thereof, with the counterholder occupying the inactive position.

FIG. 8 shows another possibility of using the gear manufacturing machine according to the present disclosure. The gear manufacturing machine is here used in a machining mode, in which the tool 14 is clamped in the tool holder 3 on only one side thereof and the counterholder 4 is at the inactive position. In the case of the embodiment shown in FIG. 8, an internal toothing 19 is machined, and in particular manufactured from a blank. Also in this case, a skiving method is used.

The workpiece with the internal toothing 19 is clamped in the present embodiment by a pot-shaped chuck 20 on the workpiece holder 1. For this purpose, the counterholder of the workpiece holder 1 was moved upwards out of the working area and/or removed.

It follows that, making use of the counterholder 4 according to the present disclosure, a milling machine, which, in a first machining mode is used for milling, in particular for hobbing external toothings by means of a tool clamped on both sides thereof, can also be used for skiving internal toothings with a second machining mode.

Figure 9:
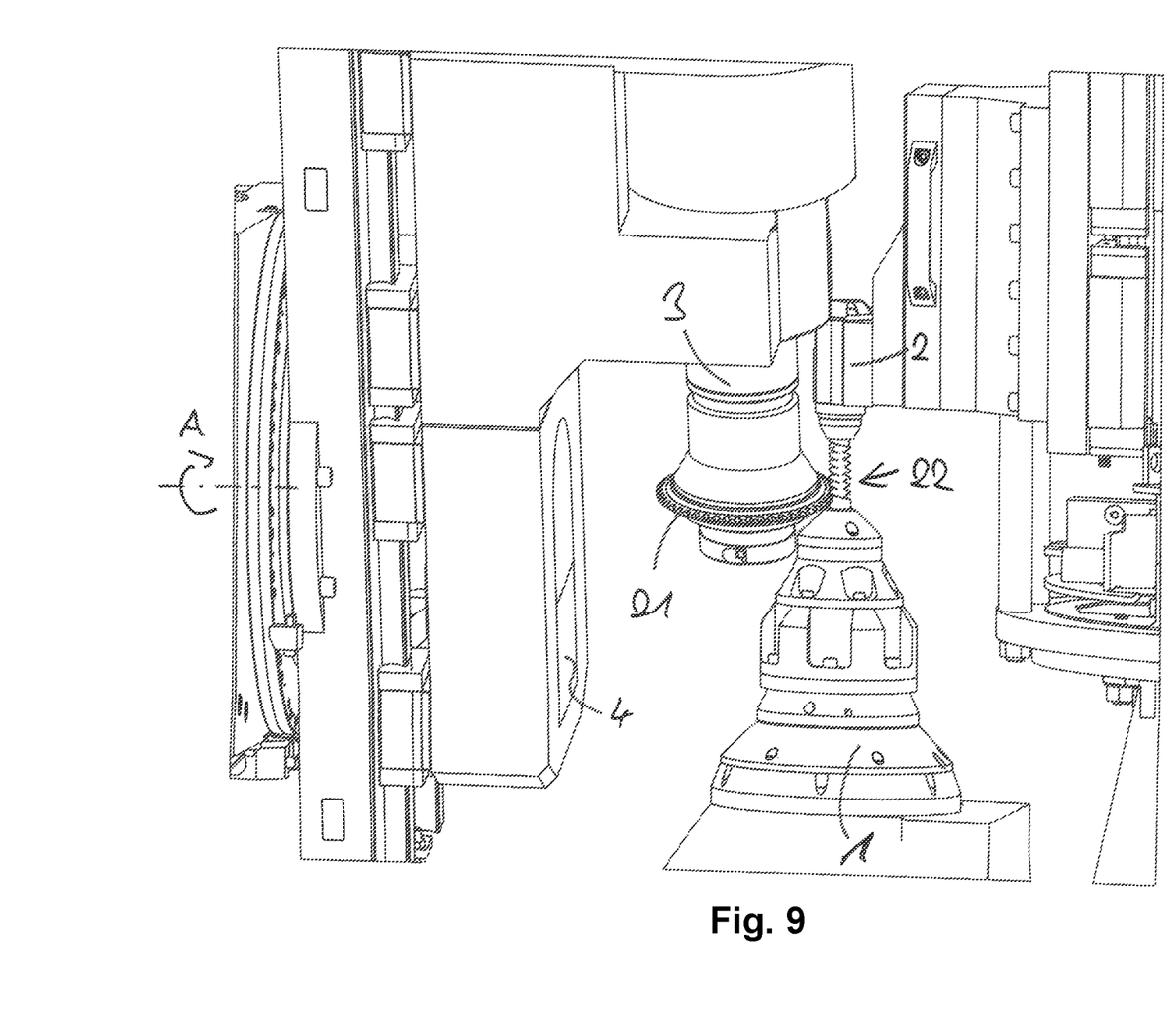
FIG. 9 shows a first step of a third embodiment of a method according to the present disclosure, in which a toothing of a workpiece is machined through a tool clamped on one side thereof, with the counterholder occupying the inactive position.
Figure 10:
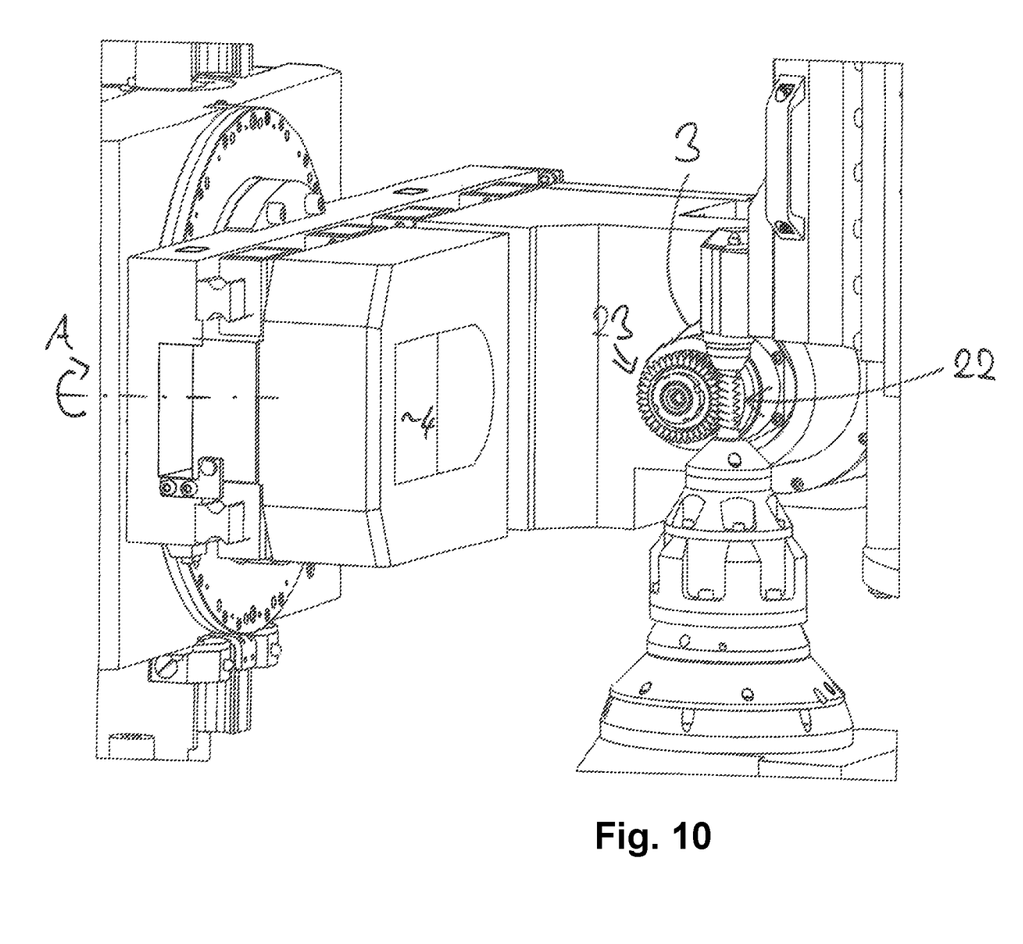
FIG. 10 shows a second step of the third embodiment of a method according to the present disclosure, in which the same toothing of the workpiece is machined through a second tool, which is also clamped on one side thereof, with the counterholder occupying the inactive position.
Figure 11:
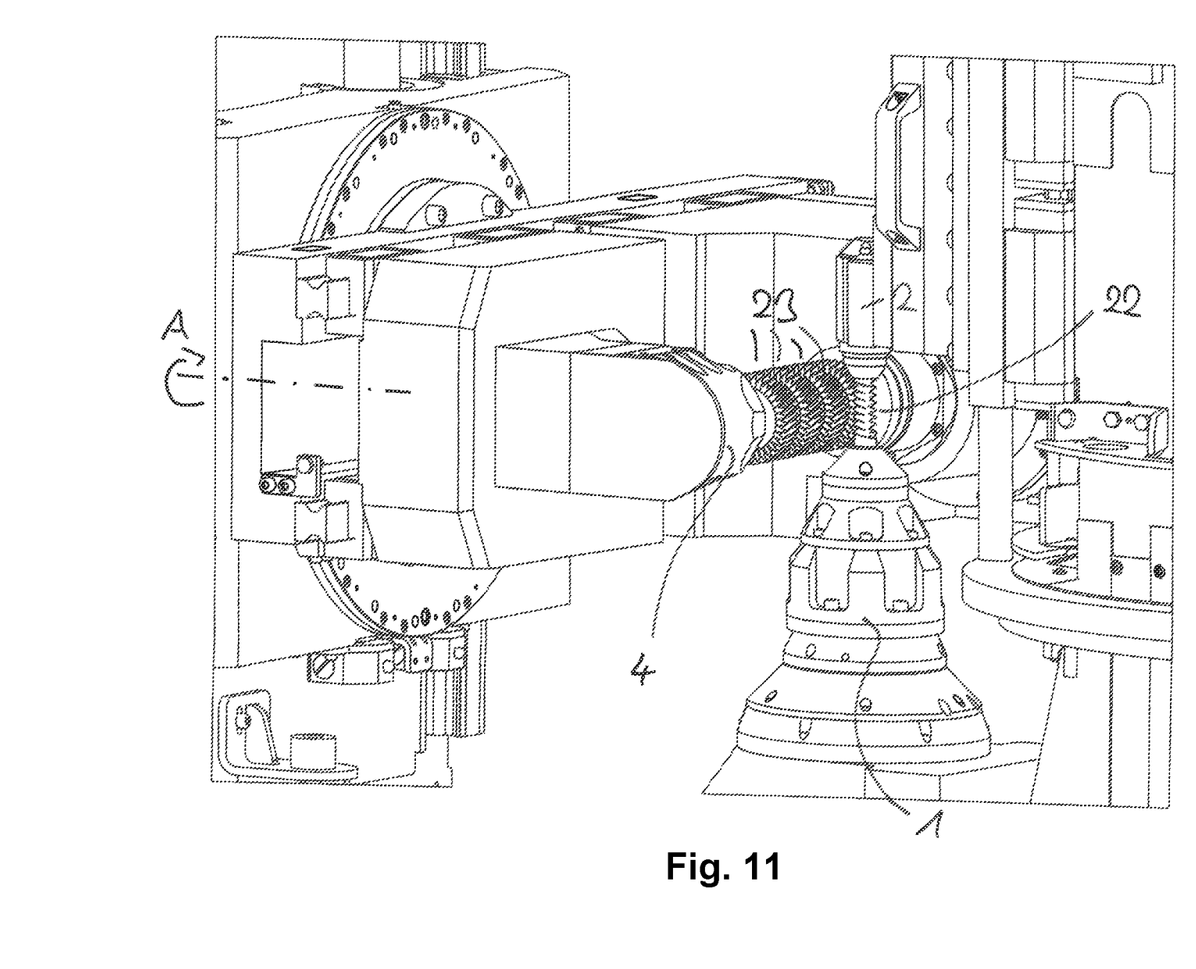
FIG. 11 shows an alternative second step of the third embodiment of a method according to the present disclosure, in which the same toothing is machined through one or a plurality of second tools, which are clamped on both sides thereof.

In FIG. 9 to FIG. 11, a third embodiment of a method according to the present disclosure is shown. The method serves to manufacture a worm toothing 22 of a workpiece clamped in the workpiece holder 1. In the present embodiment, the workpiece is clamped on both sides thereof between the workpiece holder 1 and the counterholder 2.

FIG. 9 shows a first machining step, in which the worm toothing 22 is manufactured by a milling tool 21. Due to the comparatively small axis intersection angle, which is required for manufacturing the worm toothing during milling, the milling tool 21 is clamped in the tool holder 3 on only one side thereof and the counterholder 4 is folded in, so as to prevent the formation of an interfering contour with the workpiece holder 1.

In the present embodiment, the milling tool 21 is a milling disc having milling teeth arranged along its circumference. Therefore, the rotary movement of the tool holder need not be synchronized with the rotary movement of the workpiece holder, since no generating machining takes place.

FIGS. 10 and 11 show two alternative further developments of a second machining step, in which the toothing manufactured in the first machining step is machined still further by some other tool. In so doing, one or a plurality of skiving tools 23 are in particular used, so that the second machining step is executed by skiving. This allows a substantial improvement in the surface quality of the worm toothing milled in the first machining step.

In the embodiment shown in FIG. 10, the skiving tool 23 is clamped on only one side thereof at the tool holder 3 and the counterholder 4 is therefore folded-in.

In the case of the alternative further development of the second machining step shown in FIG. 11, however, the skiving tool 23 is clamped on both sides thereof between the tool holder 3 and the extended counterholder 4. The resultant stability allows, for example, clamping a plurality of tools 23 together in an axial direction side by side in the tool holder. The tools may either be configured identically and may be provided in the form of multiple tools only for reasons of wear, or they may be configured differently and used for successive machining steps of the same toothing or for machining different toothings. The use of a counterholder for clamping the tools is possible, since a large axis intersection angle is obtained for the worm thread in the skiving process.

All the embodiments of the methods according to the present disclosure are characterized in that the axis intersection angle is changed by the pivot axis A between the two machining steps or machining modes. In the machining step with the smaller axis intersection angle, the counterholder 4 is moved to the inactive position so as not to form an interfering contour with the workpiece holder 1. In the machining step with the larger axis intersection angle, the counterholder 4 may, however, be moved to the working position and used for clamping the tool, since it will not come into conflict with the workpiece holder 1 anyhow.

As shown in the case of the first and third embodiments of a method according to the present disclosure, the gear manufacturing machine according to the present disclosure may be used in successive machining steps for machining a single workpiece, which remains clamped in the workpiece holder between the machining steps.

However, the gear manufacturing machine according to the present disclosure may also be used for machining different workpieces in respective different machining modes. In a first machining mode, a first workpiece may be machined, with the counterholder extended and the tool clamped on both sides thereof, whereas the second machining mode is used for machining one or a plurality of second workpieces, with the counterholder folded in and the tool clamped on one side thereof.

The gear manufacturing machine according to the present disclosure can easily be changed over for the two machining modes by folding the counterholder in and out or by mounting and dismounting it. The machining modes can here be carried out in the same way, as has been described above for the machining steps.

All the above described features of the machining steps and/or machining modes may also be used with a different kinematic design of the movability of the counterholder and/or a dismountability of the counterholder.

According to a possible further development of the present disclosure, the counterholder 2 of the workpiece holder may be configured in the same way as the counterholder 4 of the tool holder such that it is movable from a working position to an inactive position or releasably connectable. In this case, the structural design selected may correspond to that selected for the counterholder 4 of the tool holder.

For most cases of use, however, it will suffice to move the counterholder 2 along the linear axis, which exists anyhow and by which the axial distance between the workpiece holder 2 and the counterholder 4 can be changed, out of the working area, so as to avoid interfering contours during machining.

The invention claimed is:

1. A method of manufacturing a first and a second workpiece by a gear manufacturing machine comprising a workpiece holder and a tool holder, which each are rotatable by a drive, wherein the tool holder is arranged on a machining head, which is movable relative to the workpiece holder by one or a plurality of motion axes of the gear manufacturing machine, the tool holder having a counterholder, wherein the method comprises:
gear manufacturing machining a first workpiece held in the workpiece holder by a first tool held in the tool holder in a first machining mode, in which the first workpiece is machined by the first tool clamped on both of its sides between the tool holder and the counterholder by milling, and
gear manufacturing machining a second workpiece held in the workpiece holder by a second tool held in the tool holder in a second machining mode, in which the second workpiece is machined by the second tool clamped only on one of its sides in the tool holder by skiving, the counterholder occupying an inactive position or being dismounted from the machining head, wherein at the inactive position of the counterholder, all elements of the counterholder and its support exhibit a predetermined clear distance to an axis of the tool holder.

2. The method according to claim 1, wherein the first machining mode takes place with a first axis intersection angle between the first tool and the first workpiece, and the second machining mode takes place with a second axis intersection angle between the second tool and the second workpiece, a difference between the first and the second axis intersection angle being greater than 45°.

3. The method according to claim 1, wherein the counterholder is pivotably arranged on the machining head of the gear manufacturing machine, the counterholder being adapted to be folded in or folded away by pivoting from its working position to the inactive position.

4. The method according to claim 3, wherein the counterholder is pivotable by a pivot axis extending in a plane perpendicular to the axial direction of the tool holder, the counterholder being adapted to be folded in in the direction of the tool holder, or wherein the counterholder is pivotable by a pivot axis extending parallel to the axial direction of the tool holder.

5. The method according to claim 1, wherein the counterholder, when occupying its inactive position, is accommodated in an accommodation opening of the machining head.

6. The method according to claim 5, wherein the counterholder closes this accommodation opening and/or wherein the counterholder is supported therein.

7. The method according to claim 1, wherein the counterholder, when occupying its working position, rests on a stop element, the stop element comprising tapered pins and/or tapered pin reception units, and/or wherein the counterholder is adapted to be hydraulically clamped at its working position.

8. The method according to claim 1, wherein the counterholder is releasably connectable to the machining head by a quick-clamping system.

9. The method according to claim 1, wherein at the inactive position of the counterholder, all the interfering contours on the machining head exhibit, starting from the tool holder and seen in an axial direction, a predetermined clear distance to the axis of the tool holder.

10. A gear manufacturing machine comprising a workpiece holder and a tool holder, which each are rotatable by a drive, wherein the tool holder is arranged on a machining head, which is movable relative to the workpiece holder by one or a plurality of motion axes of the gear manufacturing machine for gear manufacturing machining a workpiece held in the workpiece holder by a tool held in the tool holder, the tool holder having a counterholder, wherein
the counterholder is at least one out of movable from its working position to an inactive position and arranged on the machining head of the gear manufacturing machine in a releasably connectable manner,
the gear manufacturing machine further comprising a control unit configured to carry out a method according to claim 1.

11. A method of manufacturing a workpiece by a gear manufacturing machine comprising a workpiece holder and a tool holder, which each are rotatable by a drive, wherein the tool holder is arranged on a machining head, which is movable relative to the workpiece holder by one or a plurality of motion axes of the gear manufacturing machine, the tool holder having a counterholder, wherein the method comprises:
gear manufacturing machining the workpiece held in the workpiece holder by a first tool held in the tool holder in a first machining step, in which the workpiece is machined by the first tool clamped on both of its sides between the tool holder and the counterholder by milling, and
gear manufacturing machining the workpiece held in the workpiece holder by a second tool held in the tool holder in a second machining mode, in which the workpiece is machined by the second tool clamped only on one of its sides in the tool holder by skiving, the counterholder occupying an inactive position or being dismounted from the machining head, wherein at the inactive position of the counterholder, all elements of the counterholder and its support exhibit a predetermined clear distance to an axis of the tool holder.

12. The method according to claim 11, wherein the first machining step takes place with a first axis intersection angle between the first tool and the workpiece, and the second machining step takes place with a second axis intersection angle between the second tool and the workpiece, a difference between the first and the second axis intersection angle being greater than 45°.

13. The method according to claim 11, wherein the first and the second machining step are used for machining two different toothings of the workpiece.

14. The method according to claim 13, wherein the diameter of the first toothing is larger than that of the second toothing or wherein an interfering contour exists for the second toothing.

15. The method according to claim 11, wherein the first and the second machining step are used in succession for machining the same toothing of the workpiece, wherein, the machining carried out first is roughing and the machining carried out subsequently is finishing.

16. The method according to claim 11, wherein the counterholder is pivotably arranged on the machining head of the gear manufacturing machine, the counterholder being adapted to be folded in or folded away by pivoting from its working position to the inactive position.

17. The method according to claim 16, wherein the counterholder is pivotable by a pivot axis extending in a plane perpendicular to the axial direction of the tool holder, the counterholder being adapted to be folded in in the direction of the tool holder, or wherein the counterholder is pivotable by a pivot axis extending parallel to the axial direction of the tool holder.

18. The method according to claim 11, wherein the counterholder, when occupying its inactive position, is accommodated in an accommodation opening of the machining head.

19. The method according to claim 18, wherein the counterholder closes this accommodation opening and/or wherein the counterholder is supported therein.

20. The method according to claim 11, further comprising changing between the first and the second tool using an automatic tool changer.

21. A gear manufacturing machine comprising a workpiece holder and a tool holder, which each are rotatable by a drive, wherein the tool holder is arranged on a machining head, which is movable relative to the workpiece holder by one or a plurality of motion axes of the gear manufacturing machine for gear manufacturing machining a workpiece held in the workpiece holder by a tool held in the tool holder, the tool holder having a counterholder, wherein
    the counterholder is at least one out of movable from its working position to an inactive position and arranged on the machining head of the gear manufacturing machine in a releasably connectable manner,
    the gear manufacturing machine further comprising a control unit configured to carry out a method according to claim 11.

* * * * *